United States Patent
Prampolini

(10) Patent No.: US 7,673,534 B2
(45) Date of Patent: Mar. 9, 2010

(54) POWER TAKE-OFF FOR INDUSTRIAL VEHICLES

(75) Inventor: Silvano Prampolini, Bomporto (IT)

(73) Assignee: Interpump Hydraulics S.p.A., Nonantola (Modena) (IT)

( * ) Notice: Subject to any disclaimer, the term of this patent is extended or adjusted under 35 U.S.C. 154(b) by 160 days.

(21) Appl. No.: 11/815,727

(22) PCT Filed: Jan. 27, 2006

(86) PCT No.: PCT/IB2006/000547

§ 371 (c)(1),
(2), (4) Date: Aug. 7, 2007

(87) PCT Pub. No.: WO2006/090280

PCT Pub. Date: Aug. 31, 2006

(65) Prior Publication Data

US 2008/0148883 A1    Jun. 26, 2008

(30) Foreign Application Priority Data

Feb. 23, 2005   (IT) .................... MO2005A0044

(51) Int. Cl.
*F16H 37/00* (2006.01)
(52) U.S. Cl. ...................... 74/15.86; 74/409
(58) Field of Classification Search ............... 74/15.86, 74/15.82, 15.8, 11, 420, 409, 440, 460, 443
See application file for complete search history.

(56) References Cited

U.S. PATENT DOCUMENTS

| | | | | |
|---|---|---|---|---|
| 5,542,306 | A | * | 8/1996 | Fernandez ................. 74/15.86 |
| 6,497,313 | B1 | * | 12/2002 | Blalock .................... 192/18 A |
| 6,832,661 | B2 | * | 12/2004 | Palfenier et al. ............ 180/444 |
| 6,997,076 | B2 | * | 2/2006 | Menjak et al. ................ 74/409 |
| 7,007,565 | B2 | * | 3/2006 | Allen et al. .................... 74/333 |
| 2001/0003435 | A1 | * | 6/2001 | Okumura .................... 338/176 |
| 2003/0145666 | A1 | * | 8/2003 | Warner .......................... 74/11 |

FOREIGN PATENT DOCUMENTS

| | | |
|---|---|---|
| EP | 1 114 765 A2 | 7/2001 |
| EP | 1 245 426 A2 | 10/2002 |
| EP | 1 326 036 A2 | 7/2009 |
| SU | 1059330 A | 12/1983 |

* cited by examiner

*Primary Examiner*—Richard W L Ridley
*Assistant Examiner*—Terence Boes
(74) *Attorney, Agent, or Firm*—Pearne & Gordon LLP

(57) ABSTRACT

The power take-off (10) applied on industrial vehicles eliminates noisiness generated by play between cogs of transmission cogwheels (14,19) when the p.t.o. is functioning non-operatively. Thanks to a special geometry of the cog directions of the cogwheels (19, 14) in the transmission gearings, play between cogs is eliminated when there is no power transmission. The play is re-established when the p.t.o. is functioning operatively, by overcoming elastic (21) means acting axially on the gearings (14), and by thus returning the gearings (14) into a normal operative position.

11 Claims, 1 Drawing Sheet

POWER TAKE-OFF FOR INDUSTRIAL VEHICLES

TECHNICAL FIELD

Figure 1:
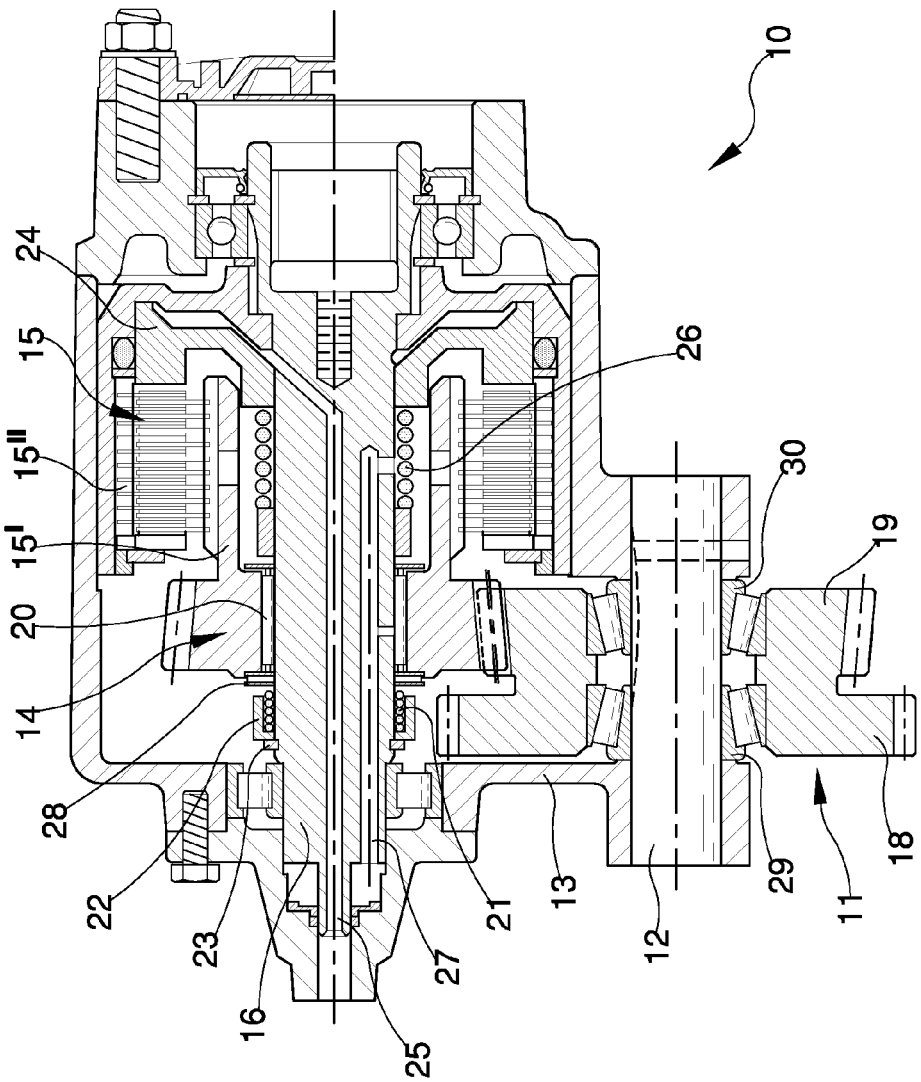

The invention relates to a power take-off. Specifically, though not exclusively, the invention is usefully applied in realizing power take-offs applied to industrial vehicles.

BACKGROUND ART

As is known, power take-offs are mechanical devices which take power from a motor in order to operate machine tools borne or trailed by a vehicle powered by the same motor.

The devices are applicable to motors of industrial vehicles or the transmission groups thereof, and are (in the case of being applied to motors) independent of the movement of the vehicle, and can be used, therefore, for applications when the vehicle is stationary. In both cases of application, the engagement of the power take-off is generally commanded by a hydraulic control acting on a multiple disc clutch comprised on the device.

When the power take-off is not in use, and the clutch is not activated, there is a level of noise which is caused by the intermediate and secondary gearings comprised in the device, which are rotated by the drive gearings. The cogs of the intermediate gearings tap continuously against the cogs of the second gearing and the primary gearing due to the necessary coupling between them, and as the driven gearings are free to move at variable angular velocities, oscillating at about the speed of the primary gearing connected to the vehicle motor.

Any reduction in the interaxes between the various gearings would certainly reduce, or even solve the problem, but such a reduction would also lead to gearing interference which, apart from generating a further though different sort of noise, would also give rise, during normal operation of the power take-off, to dangerous overloads of the cogging and equally dangerous loss of lubrication due to absence of oil circulation.

The main aim of the present invention is to provide a power take-off for industrial vehicles which is quiet, both during non-functional operation and when under load, while at the same time exhibiting characteristics of absolute efficiency and reliability.

A further aim of the invention is to provide a power take-off which exhibits innovative characteristics of quietness and reliability together with manufacturing costs that are contained with respect to the standard.

The above aims and more besides are all attained by the power take-off of the invention, in particular for industrial vehicles, of a type in which an intermediate gearing enmeshes with an external drive gearing, and a driven gearing can be constrained to the drive shaft of the power take-off, the power take-off being characterised in that it comprises gearings having conical directrices, the relative position of which is a function of the action exerted by elastic means acting in the direction of the rotation axis of at least one of the gearings and the torque transmission between the gearings.

The intermediate gearing is advantageously constituted by a pair of cylindrical cogwheels, one of which comprises a cylindrical cogging and is couplable with external drive gearings, while the other comprises a conical cogging and enmeshes with the driven gearing which is constrainable to the output shaft of the power take-off.

The position of the driven gearing with respect to the intermediate gearing is constrained by the action of the elastic means acting axially on the driven gearing; the entity of the action is such as to cause, during non-operative functioning of the power take-off, a relative positioning in which play between the cogs of the gearings is eliminated, while, when operating functionally, the positioning attained re-achieves the normal amount of play, preventing faulty interferences and guaranteeing correct hydraulic loads.

The advantages of the invention with respect to prior art power take-offs are obvious, as it removes the causes which cause high noise levels during non-operative functioning, and also correct functioning of the transmission when transmitting power to the machine tool connected to the output shaft thereof.

DISCLOSURE OF INVENTION

Other advantages and characteristics of the invention will better emerge from the detailed description that follows, of a preferred though non-exclusive embodiment of the invention, illustrated purely by way of non-limiting example in the accompanying FIGURE of the drawing, which is a schematic representation in section view of the power take-off of the present invention. With reference to FIG. 1, 10 denotes in its entirety a power take-off for industrial vehicles, as described herein below.

The power take-off 10 comprises a first gearing 11, freely rotatable on a shaft 12 and constrained to the support and containment structure 13 of the power take-off, and a second gearing 14 which is constrainable via a multiple disc clutch 15 to a support shaft 16 also constituting the output shaft of the power take-off.

The first gearing 11 comprises a pair of cylindrical cogwheels 18, 19, a first of which cogwheels 18 is provided with a cylindrically-directed cogging and is destined to couple with the external drive gearing of the vehicle speed transmission, while a second cogwheel 19 of the pair of cylindrical cogwheels exhibits a conically-directed cogging and is destined to couple with the driven second gearing 14 supported on the support shaft 16 of the power take-off. The second gearing 14 exhibits a conically-directed cogging having a same angle of inclination (directed oppositely) as the cogging of the second cogwheel 19, with which it will enmesh.

The second gearing 14 is supported on the support shaft 16, by a roller bearing 20; during the non-operative p.t.o. functioning, the bearing 20, pushed by a spring 21, is moved along the support shaft 16 up until it assumes the position illustrated in FIG. 1, in which it interacts between the second gearing 14 and a containment bushing 22 blocked axially on the support shaft 16 by a striker ring 23. This position annuls the play between the cogs of the second gearing 14 and the second cogwheel 19, the sides of the cogs of the second gearing 14 being in contact with the sides of the throats of the cogs of the second cogwheel 19, and vice versa.

The second gearing 14 is an integral part of the clutch 15 interpositioned between the second gearing 14 and the support shaft 16. The main body of the second gearing 14 extends laterally to form one of the elements 15' of a multiple disc clutch 15. The other element 15" of the multiple disc clutch 15, to which the various discs of the clutch are constrained, is activated by means of a clutch bell 24, hydraulically controlled via the pressurised fluid entering the expansion chamber of the clutch from a conduit 25 coaxial to the support shaft 16. Elastic means 26 act axially on the clutch bell 24 to guarantee the disengagement of the clutch in the absence of the pressurised command.

A second inlet conduit 27 is included internally of the support shaft 16 to convey lubricating oil to the various transmission organs.

The power take-off as structurally outlined above operates as now described. During non-engaged functioning, due to the absence of loads connected with the support shaft 16, or the disengaged position of the clutch 15, illustrated in FIG. 1, the position of the second gearing 14 is exactly as illustrated and described herein above. The entity of the action of the spring 21 is calculated in such a way as to overcome the tangential reaction occurring in this configuration on the cogs of the second gearing 14, due to the conical shape thereof, at the moment at which they are drawn by the cogs of the second cogwheel 19. The torque generated in this configuration is just sufficient to overcome the inertia of the second gearing 14.

During normal p.t.o. functioning, the torque transmitted between the second cogwheel 19 and the second gearing 14 is much greater, and is correlated to the load connected to the support shaft 16; thus the tangential reaction on the cogs of the second gearing 14 in an opposite direction to the spring 21 action, prevails over the spring 21 and causes a displacement of the second gearing 14 up to the position of contact between the ring 28 and the containment bushing 22.

The normal levels of play between the second cogwheel 19 and the second gearing 14 are re-established in this position, preventing faulty interference and guaranteeing correct lubrication.

To complete the description the first gearing 11 is rotatably constrained to the shaft 12 by conical roller bearings 29, 30 which sustain the axial thrust acting on the first gearing 11 due to the tangential reaction on the conical coggings of the second cogwheel 19.

Obviously the characteristics of the power take-off of the invention are maintained even should modifications or variations be brought to the invention as described herein.

For example, the arrangement of the various gearings could be changed, including the p.t.o. gearings, as could the type and arrangement of the elastic means for positioning at least one of the gearings. The elastic means might in fact act on the intermediate gearing rather than on the driven gearing.

Also, the type of clutch engagement interpositioned between the driven gearing and the output shaft could be changed, which in the preferred embodiment is an oil-lubricated multiple disc clutch, but which could obviously differ according to applications and powers transmitted.

The invention claimed is:

1. A power take-off (10) in particular for industrial vehicles, comprising: an intermediate first gearing (11) provided to enmesh with an external drive gearing; a driven second gearing (14), provided to enmesh with said intermediate first gearing (11); an output support shaft (16), constrainable to said driven second gearing (14); said first gearing (11) and second gearing (14) comprising enmeshing conically-directed cogging; at least one of said first and second gearing being axially displaceable with respect to the other gearing between a first position, in which sides of the cogs of the axially displaceable gearing are in contact with sides of throats of the cogs of the other gearing such that no play exists between the cogging, and a second position, in which as play is established between the cogging; elastic means (21), provided to push said axially displaceable gearing towards said first position; stop means (22, 23), provided to stop an axial displacement of the axially displaceable gearing in said second position, said stop means comprising: a containment bushing (22), coaxially mounted on the support shaft (16), and a striker ring (23), blocked axially on the support shaft (16).

2. The power take-off of claim 1, wherein said intermediate first gearing (11) is constituted by a pair of cylindrical cogwheels (18, 19), a first of which cogwheels (18) is provided with a cylindrically-directed cogging provided to couple with a drive gearing external of a vehicle speed transmission, while a second cogwheel (19) of the pair of cylindrical cogwheels exhibits a conically-directed cogging and is destined to couple with the driven second gearing (14) supported on the support shaft (16) of the power take-off.

3. The power take-off of claim 1, wherein the driven second gearing (14), constrainable to the output support shaft (16) of the power take-off and comprising a conically-directed cogging, is slidable on the support shaft (16) between said first position, in which play between coggings of the second gearing (14) and the second cogwheel (19), with which the second gearing (14) is enmeshed, is eliminated, and said second position, in which play exists between coggings of the second gearing (14) and the second cogwheel (19).

4. The power take-off of claim 2, wherein the driven second gearing (14), constrainable to the output support shaft (16) of the power take-off and comprising a conically-directed cogging, is slidable on the support shaft (16) between two positions, in one of which play between coggings of the second gearing (14) and the second cogwheel (19), with which the second gearing (14) is enmeshed, is eliminated.

5. The power take-off of claim 2, wherein the intermediate first gearing (11) is constrained to a shaft (12) by conical roller bearings (29, 30) which sustain an axial thrust acting on the first gearing (11) caused by a tangential reaction on the second cogwheel (19) with conically-directed cogs, which is a part of the first gearing (11).

6. The power take-off of claim 3, wherein said elastic means (21) are provided to act axially on the second gearing (14), an entity of the axial action being sufficient to position the second gearing (14), exclusively during non-operative functioning of the power take-off, in said first position.

7. The power take-off of claim 3, wherein the intermediate first gearing (11) is constrained to a shaft (12) by conical roller bearings (29, 30) which sustain an axial thrust acting on the first gearing (11) caused by a tangential reaction on the second cogwheel (19) with conically-directed cogs, which is a part of the first gearing (11).

8. The power take-off of claim 6, wherein the intermediate first gearing (11) is constrained to a shaft (12) by conical roller bearings (29, 30) which sustain an axial thrust acting on the first gearing (11) caused by a tangential reaction on the second cogwheel (19) with conically-directed cogs, which is a part of the first gearing (11).

9. The power take-off of claim 1, wherein the axially displaceable gearing (14), in the second position, contacts the containment bushing (22) which contacts the striker ring (23).

10. The power take-off of claim 9, wherein the intermediate first gearing (11) is constrained to a shaft (12) by conical roller bearings (29, 30) which sustain an axial thrust acting on the first gearing (11) caused by a tangential reaction on the second cogwheel (19) with conically-directed cogs, which is a part of the first gearing (11).

11. The power take-off of claim 1, wherein the intermediate first gearing (11) is constrained to a shaft (12) by conical roller bearings (29, 30) which sustain an axial thrust acting on the first gearing (11) caused by a tangential reaction on the second cogwheel (19) with conically-directed cogs, which is a part of the first gearing (11).

* * * * *